(12) United States Patent
Milne et al.

(10) Patent No.: US 6,385,516 B1
(45) Date of Patent: May 7, 2002

(54) SYSTEM FOR DISABLING DISPLAY ILLUMINATION

(75) Inventors: Gregory John Milne, Dearborn; Gregory H. Williams, Brighton; Birgit Lisa Sorgenfrei, Livonia, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/802,431

(22) Filed: Mar. 9, 2001

(51) Int. Cl.[7] .................................................. G06F 7/00
(52) U.S. Cl. ......................................... 701/36; 340/426
(58) Field of Search ............................ 701/36, 200, 45; 340/426, 430, 425.5; 307/10.2, 10.1, 10.8

(56) References Cited

U.S. PATENT DOCUMENTS

| | | | | |
|---|---|---|---|---|
| 6,032,089 A | * | 2/2000 | Buckley | 701/36 |
| 6,037,859 A | * | 3/2000 | Flick | 340/426 |
| 6,055,478 A | * | 4/2000 | Heron | 701/200 |
| 6,314,343 B1 | * | 11/2001 | Adams et al. | 701/36 |
| 6,344,801 B1 | * | 2/2002 | Aoki et al. | 701/36 |

* cited by examiner

*Primary Examiner*—Richard M. Camby
(74) *Attorney, Agent, or Firm*—John E. Kajander

(57) ABSTRACT

A system for disabling display illumination includes an electronic device, such as a radio, navigation system or entertainment device having a graphical display that may be covered with a door for enhancing vehicle interior appearance. To allow the graphical display to be read during night time driving conditions, the graphical display includes some form of graphical back lighting. A transceiver is coupled to the electronic device and generates an infrared signal for inter-module communication. When the door is closed, this infrared signal is reflected back to the electronic device indicating that the door is closed. Using this reflected signal, the graphical back lighting may be disabled to eliminate light leaks and reduce heat buildup.

26 Claims, 1 Drawing Sheet

SYSTEM FOR DISABLING DISPLAY ILLUMINATION

TECHNICAL FIELD

The present invention relates generally to back lighting automotive instrumentation, and more particularly, to a system for disabling display illumination.

BACKGROUND ART

Illuminating instrumentation using some form of back lighting remains the most widely used and preferred method of displaying automobile data to the driver during night time driving conditions. This is due to their simple function and ability to be adapted to many different styles. Future requirements for instruments will unquestionably include back lighting.

To enhance vehicle interior styling, some vehicle interiors include a door that can cover the Radio or Navigation System or remote display for appearance enhancement. Unfortunately, during night time driving conditions, Radio and Navigation System graphics are illuminated. When the vehicle operator decides to close the door, unacceptable light leaks and heat build up may occur. To solve this problem, a method, such as a switch, must be used to detect door closure so that the illumination can be disabled. Unfortunately, the addition of a switch to detect door closure results in extra system cost and reduced reliability.

The disadvantages associated with these conventional illumination disabling techniques have made it apparent that a new technique for disabling illumination is needed. The new technique should not require a switch to detect door closure. Additionally, the new technique reduce system cost while improving overall reliability. The present invention is directed to these ends.

SUMMARY OF THE INVENTION

It is, therefore, an object of the invention to provide an improved and reliable system for disabling display illumination. Another object of the invention is to disable display illumination without requiring an additional switch.

In accordance with the objects of this invention, a system for disabling display illumination is provided. In one embodiment of the invention, a system for disabling display illumination includes an electronic device, such as a radio or navigation system having a graphical display that may be covered with a door for enhancing vehicle interior appearance. To allow the graphical display to be read during night time driving conditions, the graphical display includes some form of graphical back lighting. A transceiver is coupled to the electronic device and generates an infrared signal for inter-module communication. When the door is closed, this infrared signal is reflected back to the electronic device indicating that the door is closed. Using this reflected signal, the graphical back lighting may be disabled to eliminate light leaks and reduce heat buildup.

The present invention thus achieves an improved system for disabling display illumination. The present invention is advantageous in that it will reduce system cost while improving overall reliability.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
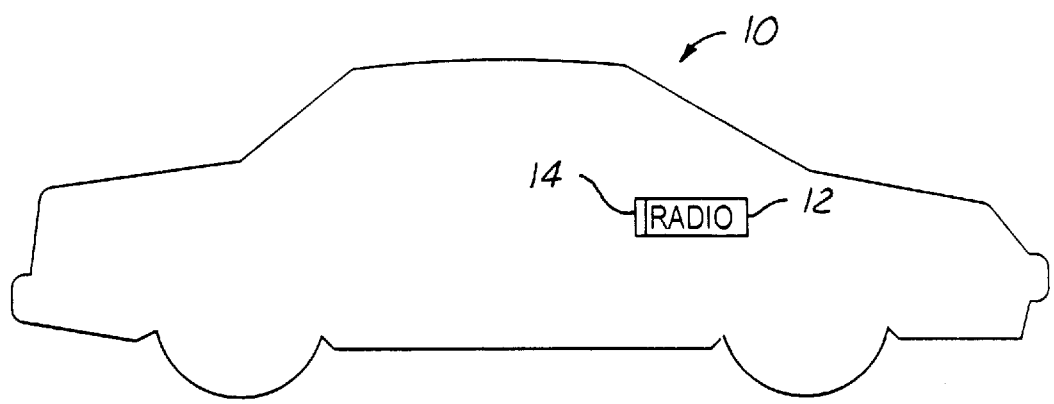
FIG. 1 is a block diagram of a vehicle using a system for disabling display illumination in accordance with one embodiment of the present invention.

In the following figures, the same reference numerals will be used to identify identical components in the various views. The present invention is illustrated with respect to a system for disabling display illumination, particularly suited for the automotive field. However, the present invention is applicable to various other uses that may require an illumination disabling technique.

Referring to FIG. 1, a block diagram of a vehicle 10 having a electronic device 12 using a system for disabling display illumination 14 in accordance with one embodiment of the present invention is illustrated. In the preferred embodiment, electronic device 12 includes some form of graphics with display illumination. One skilled in the art would realize that electronic device 12 may be many forms of instrumentation, such as a Navigation System or remote display.

Illuminating instrumentation using some form of back lighting remains the most widely used and preferred method of displaying automobile data to the driver during night time driving conditions. This is due to their simple function and ability to be adapted to many different styles. Future requirements for instruments will unquestionably include back lighting.

To enhance vehicle interior styling, some vehicle interiors include a door (best seen in FIG. 3) that can cover the radio 12 or navigation system for appearance enhancement. When the vehicle operator decides to close the door, light leaks and heat build up may occur unless graphic back lighting is disabled. The present invention solves this problem without the addition of an extra switch.

In many applications, the radio 12 or navigation system includes an infrared or IrDA transceiver for communication purposes. Usually this infrared transceiver is mounted on the face of the device in question. In this case, this transceiver may be used to sense door closure without requiring the extra cost and complexity of a switch. When the transceiver detects door closure, all graphic backlighting behind the door is disabled.

Figure 2:
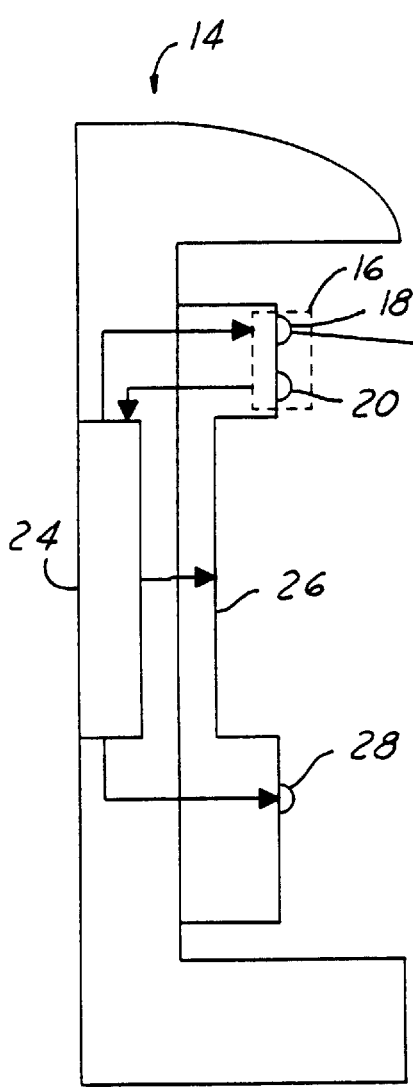
FIG. 2 is a block diagram of a system for disabling display illumination, with an open door, in accordance with one embodiment of the present invention.

Referring to FIG. 2, a block diagram of a system for disabling display illumination 14, with an open door, in accordance with one embodiment of the present invention is illustrated. System 14 includes an infrared or IrDA transceiver 16. Infrared transceiver 16 includes a transmitter 18 and a receiver 20. The transceiver 16 is constructed for full duplex operation, so that it may simultaneously transmit and receive, with minimum optical coupling between transmitter 18 and receiver 20 in free space. Typically, transceiver 16 is used for inter-module communications.

Figure 3:
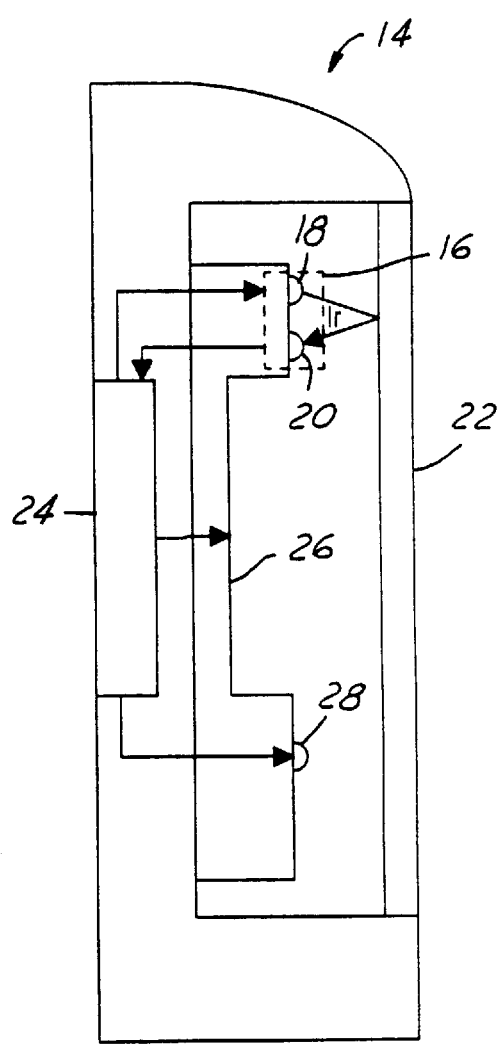
FIG. 3 is a block diagram of a system for disabling display illumination, with a closed door, in accordance with one embodiment of the present invention.

FIG. 3 is a block diagram of a system for disabling display illumination 14, with a closed door 22, in accordance with one embodiment of the present invention is illustrated. When door 22 is open, the transmitter 18 is unobstructed. Therefore, receiver 20 will not receive the signal generated by transmitter 18. When door 22 is closed, the infrared signal from transmitter 18 will be reflected back to receiver 20 and sensed by the controlling microprocessor 24. When this occurs, microprocessor 24 will reduce or disable the illumination of display 26 and other illumination sources such as button LEDs 28, incandescent bulbs, halogen bulbs, neon bulbs, laser light sources, or fluorescent bulbs.

The present invention thus achieves an improved and reliable system for disabling display illumination by using an existing infrared transceiver to detect door position. In this way, the present invention does not require a switch to detect door closure. Additionally, the present invention reduces system cost while improving overall reliability.

From the foregoing, it can be seen that there has been brought to the art a new and improved system for disabling display illumination. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An apparatus for disabling display illumination comprising:
    an electronic device having a graphical display, wherein said graphical display includes an illumination element;
    a door coupled to said electronic device, wherein said graphical display is blocked when said door is closed; and
    a transceiver coupled to said electronic device, said transceiver including a transmitter and a receiver, said transmitter transmitting a signal, wherein said receiver receives said signal when said door is closed, said illumination elements being disabled when said receiver receives said signal.

2. The apparatus for disabling display illumination as recited in claim 1, wherein said electronic device is a radio.

3. The apparatus for disabling display illumination as recited in claim 1, wherein said electronic device is a navigation system.

4. The apparatus for disabling display illumination as recited in claim 1, wherein said illumination element is an incandescent bulb.

5. The apparatus for disabling display illumination as recited in claim 1, wherein said illumination element is a LED.

6. The apparatus for disabling display illumination as recited in claim 1, wherein said illumination element is a LED backlight.

7. The apparatus for disabling display illumination as recited in claim 1, wherein said illumination element is a halogen bulb.

8. The apparatus for disabling display illumination as recited in claim 1, wherein said illumination element is a neon bulb.

9. The apparatus for disabling display illumination as recited in claim 1, wherein said illumination element is a laser light source.

10. The apparatus for disabling display illumination as recited in claim 1, wherein said illumination element is a fluorescent light source.

11. The apparatus for disabling display illumination as recited in claim 1, wherein said illumination element is an emissive type display.

12. The apparatus for disabling display illumination as recited in claim 1, wherein said transceiver is an infrared transceiver.

13. The apparatus for disabling display illumination as recited in claim 1, wherein said transceiver is an IrDA transceiver.

14. The apparatus for disabling display illumination as recited in claim 1, wherein said transceiver is used for inter-module communication.

15. An system for disabling display illumination comprising:
    a vehicle having a vehicle interior;
    an electronic module located in said vehicle interior and having a graphical display, wherein said graphical display includes an illumination element;
    a door coupled to said electronic module, wherein said graphical display is blocked from said vehicle interior when said door is closed;
    an infrared transceiver coupled to said electronic module, said infrared transceiver including an infrared transmitter and an infrared receiver, said infrared transmitter transmitting an infrared signal, wherein said infrared receiver receives said infrared signal when said door is closed; and
    a microprocessor located in said electronic module and coupled to said infrared transceiver and said illumination element, said microprocessor including control logic operative to disable said illumination element when said infrared receiver receives said infrared signal.

16. The system for disabling display illumination as recited in claim 15, wherein said illumination element is an incandescent bulb.

17. The system for disabling display illumination as recited in claim 15, wherein said illumination element is a LED.

18. The system for disabling display illumination as recited in claim 15, wherein said illumination element is a LED backlight.

19. The system for disabling display illumination as recited in claim 15, wherein said illumination element is a halogen bulb.

20. The system for disabling display illumination as recited in claim 15, wherein said illumination element is a neon bulb.

21. The system for disabling display illumination as recited in claim 15, wherein said illumination element is a laser light source.

22. The system for disabling display illumination as recited in claim 15, wherein said illumination element is a fluorescent light source.

23. The system for disabling display illumination as recited in claim 15, wherein said illumination element is an emissive type display.

24. The system for disabling display illumination as recited in claim 15, wherein said transceiver is used for inter-module communication.

25. A method for disabling display illumination comprising the step of:
    providing a graphical display,
    providing illumination for said graphical display;
    providing a door for covering said graphical display;
    transmitting an infrared signal;

receiving said infrared signal when said door is covering said graphical display; and disabling said illumination when said door is covering said graphical display based upon receiving said infrared signal.

26. The method for disabling display illumination as recited in claim 25, further comprising the step of communicating between modules using said infrared signal.

* * * * *